UNITED STATES PATENT OFFICE 2,683,717

FLUORESCENT VAT DYESTUFFS

Wilhelm Schmidt-Nickels, Little York, N. J., assignor to General Aniline & Film Corporation, New York, N. Y., a corporation of Delaware No Drawing. Application December 30, 1950,
Serial No. 203,790

8 Claims. (Cl. 260—307.5)

This invention relates to carbon compounds and processes for their production. More particularly, it relates to new fluorescent vat dyestuffs containing a thiophene ring and an oxazole ring, and which have the following basic structural formula:

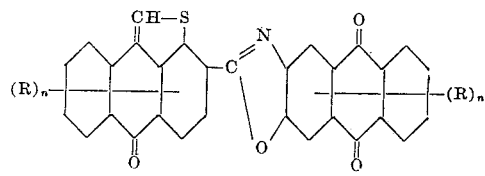

where R may be any inert substituent, such as alkyl, alkoxy, halogen and the like, and $n$ is from 0 to 6.

An object of this invention is the production of new and valuable chemical compounds, dyestuffs, dye intermediates and chemical processes. Other objects will appear hereinafter.

In general, these objects may be accomplished by reacting a 1,9-thiophenanthrone-2-carboxylic acid or halide with a 2-amino-3-substituted anthraquinone in the following manner:

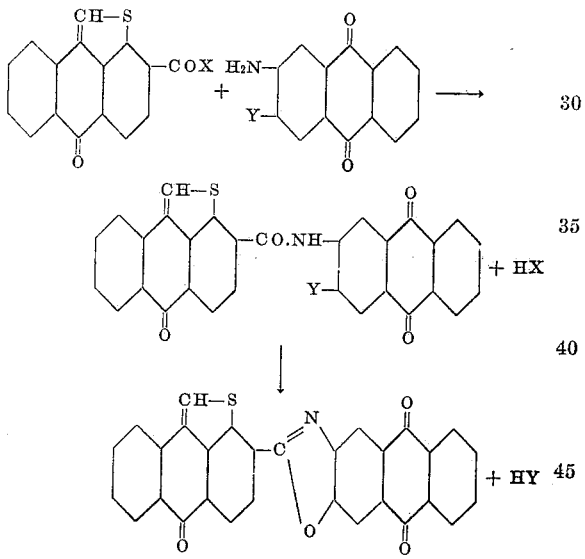

where X and Y are halogen or OH. The reaction, accordingly, is seen to involve an acylation and a ring closure.

The invention may be illustrated by the following examples, although it is understood that the invention is not to be limited thereby.

*Example 1*

A charge of 100 parts by volume nitrobenzene
7 parts by weight 1,9-thiophenanthrone-2-carboxylic acid and
8.9 parts by volume thionyl chloride is stirred at 75–80° C. for 1½ hours. Then the temperature is raised to reflux whereafter the condenser is placed in a slant position allowing about 33 parts by volume of liquid to distill off. To the 1,9-thiophenanthrone-2-carboxylic acid chloride thus produced is added:

6 parts by weight 2-amino-3-oxyanthraquinone.

After agitation under reflux at 200–205° C. for 4 hours, the mass is allowed to cool to room temperature, filtered, washed with nitrobenzene, benzene and dried.

5 parts by weight of the product so obtained is introduced into
50 parts by volume conc. sulfuric acid (96%). The charge is stirred at 145° C. for ½ hour, cooled to room temperature and poured into water. The dyestuff so obtained is purified by boiling it in an aqueous alkaline sodium hypochlorite solution in the customary manner.

The reaction may be formulated as follows:

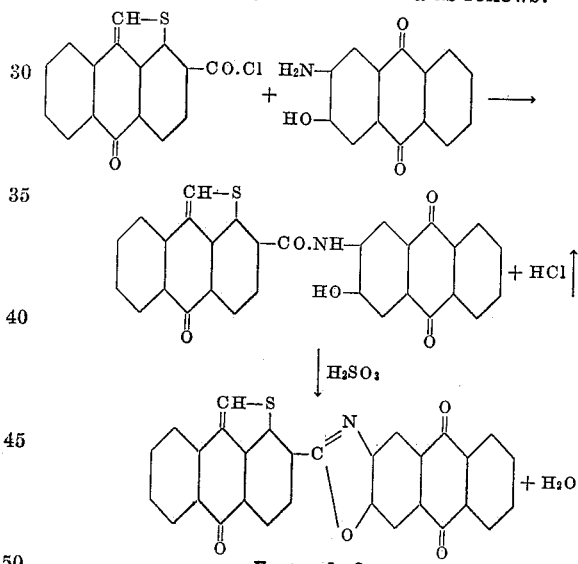

*Example 2*

A charge of 60 parts by volume nitrobenzene
4 parts by weight 1,9-thiophenanthrone-2-carboxylic acid and 5.1 parts by volume thionyl chloride is converted to 1,9 - thiophenanthrone - 2 - carboxylic acid chloride as described in Example 1. Then an addition is made of 3.7 parts by weight 2-amino-3-chlor-anthraquinone. The charge is stirred at 150° C. for 3 hours and then at 180° C. for 3 hours. After cooling to room temperature, the reaction product is filtered off, washed with nitrobenzene, benzene and dried. The product so obtained is cyclicized as follows:

A charge of 40 parts by volume nitrobenzene
7 parts by weight of the foregoing reaction product
5 parts by weight sodium carbonate anhydrous and
0.05 parts by weight copper oxide is stirred at 210° C. for 12 hours. After cooling to room temperature, the product is filtered off, washed with nitrobenzene, alcohol, water and dried. An amount of the dry product of 3.5 parts by weight is stirred in
35 parts by volume conc. sulfuric acid (96%) at 60° C. for 1 hour. Then the solution is poured into a solution of 3.5 parts by weight potassium bichromate in
350 parts by volume water. The suspension is boiled for 1 hour, filtered, and washed neutral. The wet cake is introduced into 250 parts by volume water
10 parts by volume 20% aqueous sodium hydroxide solution and
50 parts by volume of 16% aqueous sodium hypochlorite solution. After refluxing for 8 hours, the yellow vat dyestuff is filtered off, washed neutral and dried. It dyes cotton from a brown vat a strong greenish tinted yellow shade of unusual brightness, fast to chlorine and washing and of a yellow fluorescence under ultra violet light.

The reaction may be formulated as follows:

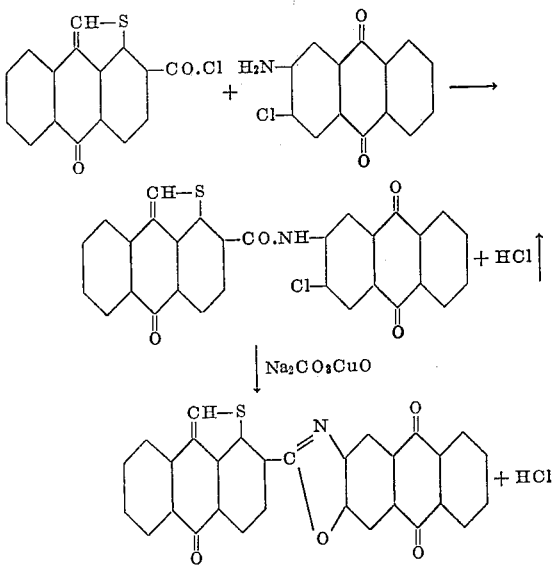

The process as described hereinbefore may be modified and/or adjusted by a worker skilled in the art without departing from the scope of the invention. The following modifications are suggested by way of example only and are not to be regarded as restrictive.

The invention usually involves two steps, the first step being an acylating condensation reaction and the second step involving a ring closure to produce the desired product. Both the acylation reaction and the ring closure are preferably effected by heating the substances together in solution or suspension, if desired in the presence of condensing agents. Preferably high boiling inert organic solvents are employed as diluents, as for example, nitrobenzene, xylene, naphthalene, the mono-, di- and trichlorbenzenes and the like, except perhaps in the cyclicizing step involving 2 - amino-3-oxyanthraquinone, which step may be accomplished in concentrated sulfuric acid alone in the absence of an organic diluent.

The particular temperature and the time of reaction for any specific process will, of course, be somewhat inversely related and dependent upon the specific compounds being condensed, the diluent, condensing agents, and the like, and may be readily determined by one skilled in the art. Thus, the temperature may range from room temperature to the point of decomposition of the particular compounds involved although usually temperatures of about 110 to 210° C. prescribe the outside limits. Similarly, the time necessary to complete the reaction usually takes from about 30 minutes to about 20 hours or more. Illustratively, the temperature of the cyclization with concentrated sulfuric acid in Example 1 may range from 130–160° C., and the temperature in Example 2 may range from 180–210° C. for the sodium carbonate-copper oxide treatment and 50–70° C. for the subsequent concentrated sulfuric acid treatment. In other words, the reaction is allowed to continue at raised temperatures until completed, as may be indicated by cessation of bubbling where the by-product is gaseous, of precipitation where a product is insoluble, etc.

If desired, an acid binding agent may be employed to facilitate the acylation reaction, as for example, anhydrous alkali metal acetates and carbonates, pyridine and the like. Other cyclicizing agents than those employed in the examples may be used, the selection of any particular agent depending upon the reactants involved. Thus, the intermediate amide may be cyclicized or ring closed in the presence of anhydrous alkali metal acetate and copper powder in nitrobenzene, or of calcined soda in naphthalene, or of calcined soda, copper acetate and copper bronze in naphthalene, or similar agents known in the art.

Under proper conditions, acylation and ring closure may be accomplished in one step to produce the desired product. Thus, the desired thiophene-oxazole product is obtained when 1,9-thiophenanthrone-2-carboxylic acid chloride is heated with 2-amino-3-chloroanthraquinone in nitrobenzene in the presence of anhydrous sodium carbonate and copper oxide followed by treatment with concentrated sulfuric caid.

Substituted derivatives may be produced by reacting the corresponding substituted 1,9-thiophenanthrone-2-carboxylic acid compound with the corresponding substituted 2-amino-3-substituted anthraquinones, care, of course, being taken so that substituents are avoided which will interfere with the progress of the desired reaction. Examples of substituents are methyl, ethyl, propyl, isobutyl, heptadecyl, methoxy, ethoxy, octadecoxy, halogens such as chlorine, bromine, and the like. More preferably, where a halogenated derivative is desired, the cyclicized dyestuff is subjected to halogenation.

The dyeings on cotton of the unsubstituted type of product produced in the examples are distinguished by unusual brightness of its greenish tinted yellow giving a yellow fluorescence under ultraviolet light. The dyeings are very fast to chlorine and washing.

My invention has been described with respect to certain preferred embodiments thereof but various modifications and variations within the spirit and scope of the invention will become apparent to those skilled in the art. It is accordingly understood that such modifications and variations are to be considered as within the purview of this application and the scope of the appended claims.

I claim:

1. A compound of the formula:

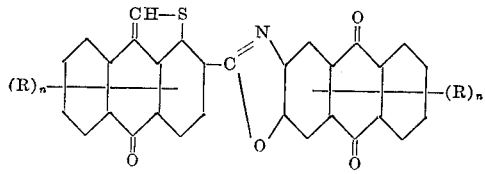

wherein R is selected from the group consisting of alkyl, alkoxy, chlorine and bromine, and $n$ is from 0 to 6.

2. A compound of the formula:

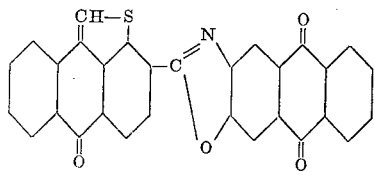

3. In a process for producing the compound of claim 1, the steps comprising heating 1,9-thiophenanthrone - 2 - carboxylic acid chloride with 2-amino-3-chloroanthraquinone in nitrobenzene at a temperature of about 180–210° C. in the presence of anhydrous sodium carbonate and copper oxide followed by treatment with concentrated sulfuric acid at a temperature of about 50–70° C.

4. In a process for producing the compound of claim 2, the steps comprising reacting a 1,9-thiophenanthrone - 2 - carboxylic acid chloride with a 2-amino anthraquinone containing in the three position a member of the group consisting of Cl, Br and OH at a temperature of about 110 to 210° C. and subsequently subjecting the reaction product to treatment with concentrated sulfuric acid at a temperature of about 50 to 160° C.

5. In a process for producing the compound of claim 2, the steps comprising reacting a 1,9-thiophenanthrone-2-carboxylic acid chloride with a 2-amino-3-hydroxy-anthraquinone at a temperature of about 110 to 210° C. and subsequently subjecting the reaction product to treatment with concentrated sulfuric acid at a temperature of about 130 to 160° C.

6. In a process for producing the compound of claim 2, the steps comprising reacting a 1,9-thiophenanthrone - 2 - carboxylic acid chloride with a 2-amino-3-chloro-anthraquinone at a temperature of about 110 to 210° C. and subsequently subjecting the reaction product to treatment with an anhydrous alkali metal carbonate and copper catalyst at a temperature of about 180 to 210° C. followed by treatment with concentrated sulfuric acid at a temperature of about 50 to 70° C.

7. In a process for producing the compound of claim 3, the steps comprising reacting 1,9-thiophenanthrone-2-carboxylic acid chloride with 2-amino-3-hydroxy-anthraquinone at a temperature of about 200 to 205° C. and then subjecting the reaction product to treatment with concentrated sulfuric acid at a temperature of about 130 to 160° C.

8. In a process for producing the compound of claim 3, the steps comprising reacting 1,9-thiophenanthrone - 2 - carboxylic acid chloride with 2-amino-3-chloro-anthraquinone at a temperature of about 150 to 180° C. and subsequently subjecting the reaction product to treatment with anhydrous sodium carbonate and copper oxide at a temperature of about 180 to 210° C. followed by treatment with concentrated sulfuric acid at a temperature of about 50 to 70° C.

References Cited in the file of this patent

UNITED STATES PATENTS

| Number | Name | Date |
|---|---|---|
| 1,931,196 | Kalischer | Oct. 17, 1933 |
| 2,135,258 | Muenster | Nov. 1, 1938 |

FOREIGN PATENTS

| Number | Country | Date |
|---|---|---|
| 298,545 | Great Britain | Oct. 8, 1928 |
| 363,832 | Great Briatin | Dec. 31, 1931 |
| 545,001 | Germany | Feb. 24, 1932 |
| 698,868 | France | Feb. 6, 1931 |